United States Patent [19]

Clerc et al.

[11] Patent Number: 4,693,136
[45] Date of Patent: Sep. 15, 1987

[54] TELESCOPIC SUB-ASSEMBLY FOR A STEERING COLUMN

[75] Inventors: Michel M. Clerc, Valentigney; Frederic M. Mouhot, Voujeaucourt; Jean-Pierre Barnabé, Valentigney, all of France

[73] Assignee: Cycles Peugeot, Valentigney, France

[21] Appl. No.: 903,931

[22] Filed: Sep. 5, 1986

[30] Foreign Application Priority Data

Sep. 6, 1985 [FR] France ................... 85 13283

[51] Int. Cl.⁴ ............................................. B62D 1/18
[52] U.S. Cl. ..................................... 74/492; 403/377; 403/383
[58] Field of Search ................. 403/377, 383, 285; 74/492

[56] References Cited

U.S. PATENT DOCUMENTS 3,394,612  7/1968  Bogosoff et al. ............... 74/492
4,535,645  8/1985  Bisschop et al. ............ 403/383 X

FOREIGN PATENT DOCUMENTS 2108913  9/1971  Fed. Rep. of Germany ........ 74/492
2078950  5/1971  France .
2161449  6/1973  France .
2528001  9/1983  France .

*Primary Examiner*—Andrew V. Kundrat
*Attorney, Agent, or Firm*—Sughrue, Mion, Zinn, Macpeak & Seas

[57] ABSTRACT

This sub-assembly is formed by two shafts (1, 2), an inner and an outer shaft respectively, of which the surfaces facing one another are in contact locally in the vicinity of diametrically opposite points (16, 18), a space (22) being provided between them between the contact zones. These contact zones (8, 10, 12, 14) are pressed together as a result of force-fitting and elastic deformation, the inner shaft (1) initially having extra thicknesses, while the cavity of the outer shaft has portions narrower than these extra thicknesses. The shafts can, however, shift axially under the effect of a substantial shock.

11 Claims, 5 Drawing Figures

TELESCOPIC SUB-ASSEMBLY FOR A STEERING COLUMN

It is more and more common to produce the steering columns of motor vehicles in the form of a telescopic sub-assembly which, in the event of a shock, is capable of retracting axially to prevent serious injury to the driver's chest. However, it is absolutely essential that these columns should transmit the rotary movements of the steering-wheel reliably and accurately.

To reconcile these two requirements, steering columns at the present time often comprise a sub-assembly formed by two shafts which are mounted telescopically inside one another and which are connected by means of one or more intermediate pieces intended to compensate the clearance and regulate the axial forces, so that the column only retracts under a specific force. This system makes it considerably more complicated to produce the steering column, and because of this it is costly and difficult to install.

The object of the present invention is to overcome these disadvantages by providing a telescopic sub-assembly which does not make use of any intermediate piece, but which makes it possible to achieve both a reliable rotational drive and retraction under the effect of substantial shock, without any risk of jamming.

In fact, the subject of this invention is a telescopic sub-assembly which comprises two shafts, the ends of which are fitted into one another, and in which the surfaces of the two shafts facing one another are in contact as a result of force-fitting together with elastic deformation, in two narrow zones adjacent to two diametrically opposite tips, along substantially planar faces located on either side of said opposite tips, whilst a clearance separates these surfaces over the entire remaining part of their periphery.

The two shafts are thus made integral with one another in terms of rotation as a result of the close contact between the two opposite zones, but under the effect of a substantial shock sufficient to counteract the contact force between the fitted zones they can shift axially relative to one another.

According to another characteristic of the invention, the inner shaft has a greater width in the contact zones than over the rest of its periphery.

Preferably, the cavity of the outer shaft has narrower parts corresponding to the contact zones.

According to a preferred embodiment, the two shafts are in contact over a certain length and beyond that form a clearance zone.

Moreover, the following description of embodiments given as non-limiting examples and illustrated in the attached drawings will reveal the advantages and characteristics of the invention.

Figure 1:
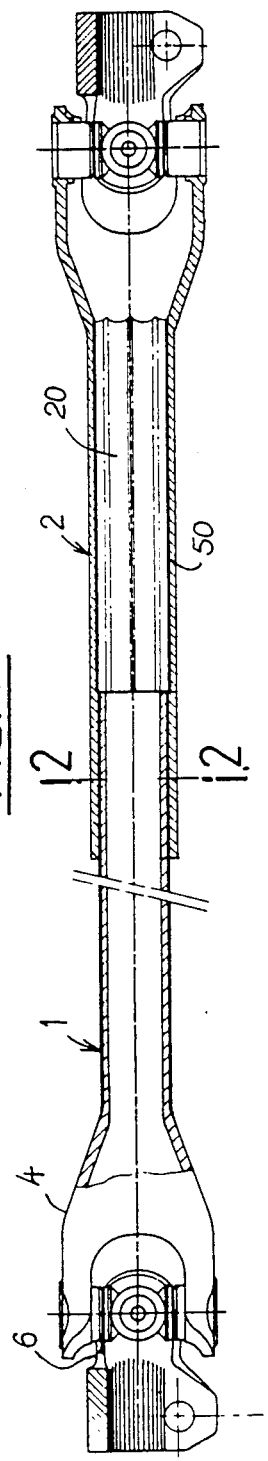
FIG. 1 is a view in the form of a longitudinal section through a steering-column sub-assembly according to the invention.

The sub-assembly illustrated in FIG. 1 is formed by two shafts 1 and 2 respectively which, in the embodiment illustrated, each end in a fork 4 supporting a cardan joint 6. The shafts 1 and 2 are fitted into one another so that they can shift telescopically relative to one another. However, the shaft 2 which has a cylindrical outer surface, as shown in FIG. 2, has an inner surface of polygonal form.

The inner shaft 1 is likewise tubular, its inner surface being cylindrical, but it has an outer surface which again is polygonal.

The polygons formed by the surfaces of the two shafts 1 and 2 facing one another are not regular, with the result that these two shafts are in close contact with one another in the zones 8, 10 and 12, 14 located in the vicinity of two diametrically opposite tips 16, 18.

Figure 2:
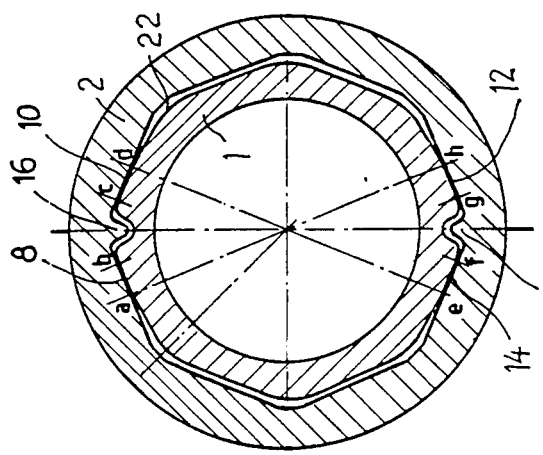
FIG. 2 is a sectional view along line 2—2 of FIG. 1.

Preferably, as shown in FIG. 2, the contact surfaces between the two shafts 8, 10 or 12, 14 are arranged symmetrically relative to the axis passing through the tips 16 and 18. These contact surfaces correspond to a portion of greater width of the inner shaft 1, which corresponds to a narrow part of the inner cavity 20 of the outer shaft 2.

On either side of the surfaces 8, 10 and 12, 14, the two shafts are separated by a narrow clearance 22.

In practice, the sub-assembly is produced by means of an outer shaft 2 which, before the sub-assembly is joined together, has a polygonal inner surface, four portions 28, 30, 32, 34 of which are nearer to its centre than the rest of the sides 36. The inner cavity 20 of this shaft is therefore narrower in the vicinity of the two opposite tips 16 and 18.

Conversely, the inner shaft 1 has, at two opposite points, portions 38, 40, 42, 44 of extra thickness which are wider than the cavity 20 and, more particularly, wider than the portions 28, 32, 30, 34 of this cavity.

Consequently, when the two shafts are force-fitted into one another, they are mutually deformed, the surfaces 38, 40, 42, 44 of the inner shaft 1 tending to push outwards the faces 28, 30, 32, 34 of the cavity 20 of the outer shaft 2, whilst the latter tends to push inwards the corresponding faces of the inner shaft. Simultaneous deformation of the two shafts then occurs, and this reduces the thickness of the inner shaft 1 in the vicinity of the two diametrically opposite tips 16, 18, whereas it slightly increases the width of the cavity 20 and has a tendency to increase the thickness of the inner shaft 1 between said opposite tips 16, 18 and to reduce the width of the cavity 20 without, however, closing the clearance 22 between the two shafts. Said deformation is always an elastic deformation. Moreover, the shafts are preferably made from a same material or from materials which are different but have similar hardness so that they are both deformed together. This results in a very considerable force-fitting of the shafts practically without any risk of jamming of said shafts of which the surfaces in contact are parallel to one another and closely joined together.

To obtain a relative sliding of the two shafts it is therefore necessary to exert a substantial force on the steering column, this force of course being a function of this deformation.

In contrast, any rotation of one of the shafts is automatically transmitted in full to the other.

Preferably, as shown in FIG. 1, the shaft 2 has, beyond the zone where it is fitted together with the inner shaft 1, a clearance portion 50 in which its inner cavity is wider than the cavity 20. Consequently, when the subassembly is retracted, the inner shaft 1, when it reaches this zone, no longer rubs against the outer shaft 2. Any stress between the two shafts is then eliminated. As a result, the force required for sliding decreases progressively in proportion as the shaft 1 penetrates within the clearance zone 50.

Likewise, the shaft 1 can have, beyond the portion where it is in contact with the shaft 2, a slightly reduced outer dimension, so that its outer surface at this point does not come into contact with the inner surface of the cavity of the shaft 2, and so that the zone of resistance to the axial sliding of the two shafts is limited to a specific length, in which the surfaces facing one another are in contact with one another.

Of course, the surfaces facing one another can have any suitable form, the polygon illustrated only being given as an example.

Figure 3:
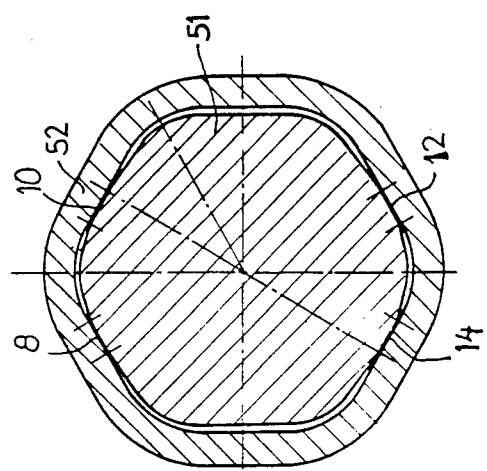
FIG. 3 is a view, similar to that of FIG. 2, of an alternative embodiment.

Likewise, the inner shaft 1 can be tubular, as shown in FIGS. 1 and 2, or solid, as shown in FIG. 3. In this figure, furthermore, the outer shaft 52 has a prismatic shape, its outer surface having the shape of a polygon similar to that of the inner surface. In this case, since the inner shaft 51 has generally a resistance higher than that of the wall of the outer shaft 52, in practice it is this wall alone which is deformed, that is to say widened near the two opposite contact zones, whereas the shaft 51 substantially retains its initial shape.

Of course, this shaft 51 has, in the same way as the shaft 1, wider portions intended for forming the surfaces of contact with the outer shaft 52, the cavity of the latter having narrower portions.

Figure 4:
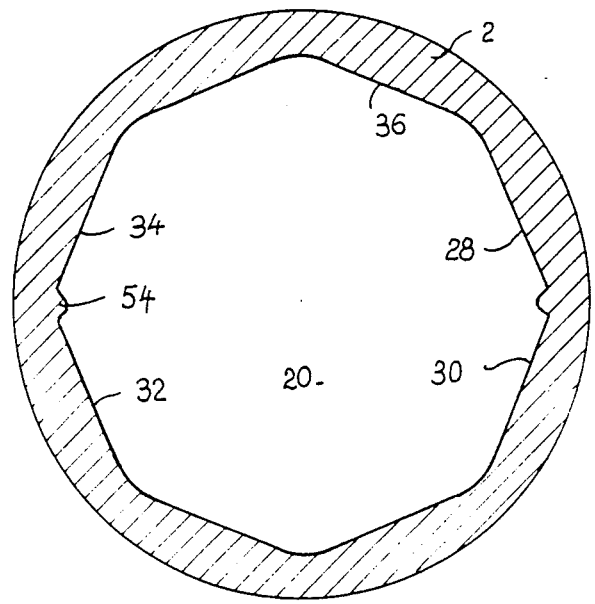
FIG. 4 is a cross-sectional view of the outer shaft before the sub-assembly is joined together.
Figure 5:
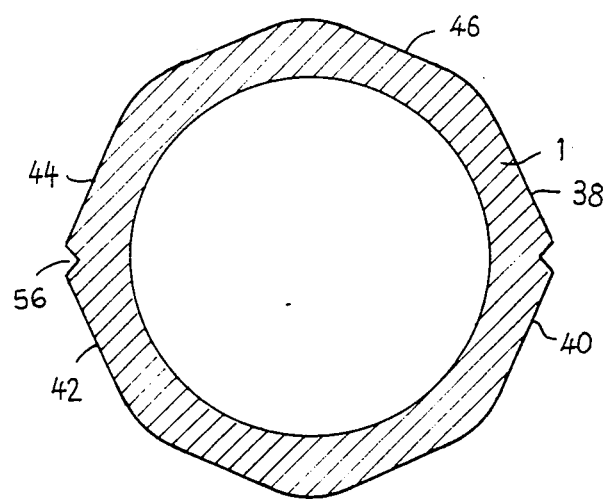
FIG. 5 is a view, similar to that of FIG. 4, showing the inner shaft—before the sub-assembly is joined together.

According to an alternative embodiment, as shown in FIGS. 2 and 4, the hollow shaft 2 possesses, at two diametrically opposite points constituting the tips 16 and 18, a tooth 54 intended for interacting with a notch 56 formed in the outer surface of the inner shaft 1 at the corresponding diametrically opposite points. By means of this arrangement, it becomes easier to centre the two shafts relative to one another when they are joined together, but above all any involuntary rotation of these two shafts relative to one another is prevented.

It is thus impossible, under the effect of an exceptional action or even an attempt at theft, to obtain a small relative angular shift of the outer shaft 2 in relation to the inner shaft 1. In fact, such a shift which is apparently of no consequence since it is limited to a very small angle, risks annoying the driver who then has to cause another shift in the opposite direction of one of the shafts only, before being able to rotate them simultaneously. This steering play is prevented because of the presence of the teeth 54 and notches 56.

We claim:

1. Telescopic sub-assembly for a steering column comprising an outer hollow shaft, an inner shaft having an end portion which is a force fit inside an end portion of the outer shaft, said end portion of the outer shaft and said end portion of the inner shaft having respectively an inner surface and an outer surface which defines a bore, each of which surfaces has a cross-sectional contour defining two diametrically opposed generally corner-shaped portions extending longitudinally of the respective shaft and two substantially planar narrow surfaces respectively adjoining opposite sides of each corner-shaped portion in narrow zones of the respective surface and extending longitudinally of the respective shaft, said fit occuring between said substantially planar surfaces of the inner shaft and outer shaft in said narrow zones, said inner surface and said outer surface defining a clearance therebetween in the rest of the contour thereof.

2. Sub-assembly according to claim 1, wherein the inner shaft has a greater cross-sectional size in diametrical planes of the narrow contact zones than in the rest of its periphery.

3. Sub-assembly according to claim 1, wherein the bore of the outer shaft has a smaller cross-sectional size in diametrical planes of the contact zones than in the rest of the bore of the outer shaft.

4. Sub-assembly according to claim 2, wherein the bore of the outer shaft has a smaller cross-sectional size in diametrical planes of the contact zones than in the of the outer shaft.

5. Sub-assembly according to claim 1, wherein the inner shaft has a smaller cross-sectional size beyond said end portion thereof.

6. Sub-assembly according to claim 1, wherein the bore of the outer shaft has a larger cross-sectional size beyond said end portion thereof.

7. Sub-assembly according to claim 1, wherein each of the shafts has a chamfered end.

8. Sub-assembly according to claim 1, wherein the inner shaft has in the vicinity of the two diametrically opposed generally corner-shaped portions circumferentially portions which, before the completion of the sub-assembly, are located diametrically apart a distance greater than the diametrical distance between corresponding circumferential portions of said bore, whereby the fitting together of the two shafts causes both a reduction in said distance apart of said circumferential portions of the inner shaft and a local widening of the bore.

9. Sub-assembly according to claim 1, wherein the outer surface of the inner shaft and the inner surface of the outer shaft have the cross-sectional shape of an irregular polygon.

10. Sub-assembly according to claim 1, wherein the inner surface of the outer shaft has, in alignment with the two diametrically opposed generally corner-shaped portions, teeth which are engaged with corresponding notches in the outer surface of the inner shaft.

11. Sub-assembly according to claim 11, wherein the inner shaft is hollow.

* * * * *